Sept. 2, 1952  M. W. MARIEN  2,609,260
PISTON PACKING RING
Filed Feb. 23, 1950
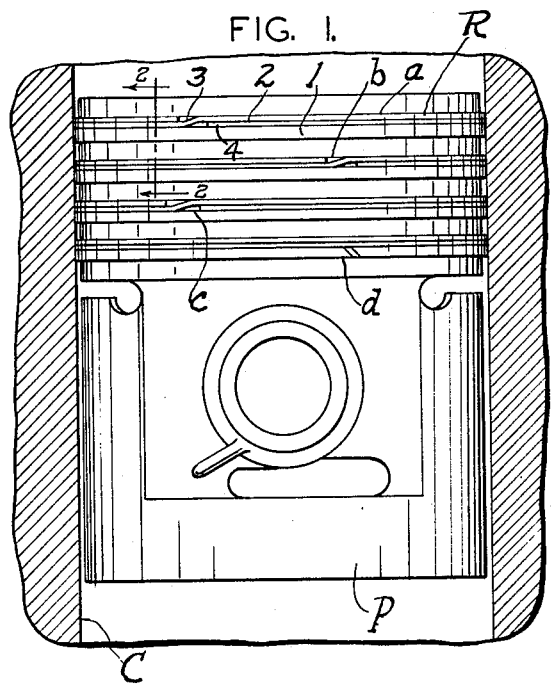
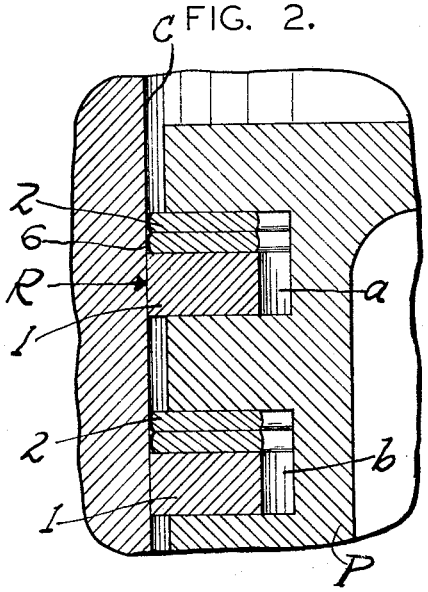
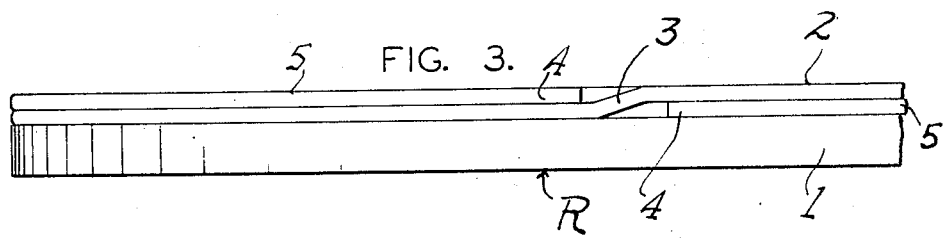
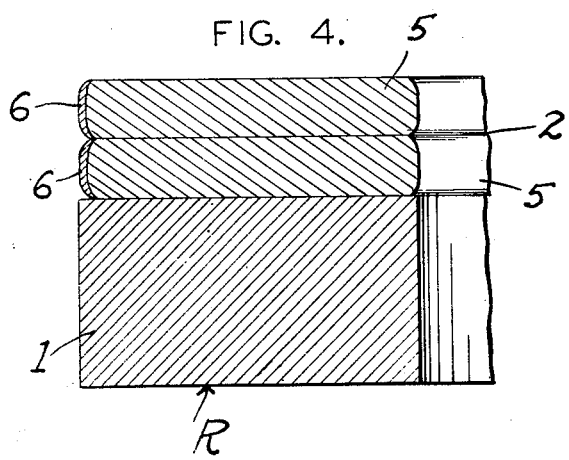
INVENTOR:
MELVIN W. MARIEN
BY Harry A. Berner
ATTORNEY.

Patented Sept. 2, 1952

2,609,260

UNITED STATES PATENT OFFICE 2,609,260

PISTON PACKING RING

Melvin W. Marien, St. Louis, Mo., assignor, by mesne assignments, to Ramsey Corporation, a corporation of Ohio Application February 23, 1950, Serial No. 145,608

4 Claims. (Cl. 309—45)

My invention has relation to improvements in piston packing rings and is directed to both the individual ring construction, and the relative pressure of the individual rings of the entire ring arrangement in a single piston.

In view of the great heat transmitted to the head of the piston by the combustion chamber, high unit pressure steel rings cannot be used satisfactorily in the upper grooves of the piston because of the scuffing of the steel surface. For this reason compression and blow-by cannot be eliminated or lessened close to the compression chamber where it is most desirable to make the correction. It is the practice, at the present time, to attempt this correction (with some results) by placing high unit pressure rings in the lower compression ring grooves. High unit pressure oil rings serve to control the oil flow over the cylinder wall and prevent leakage of the oil generally known as "oil pumping." However, "blow-by" or the loss of compression cannot be effectively prevented by this type of ring in the upper grooves.

A common type of high unit pressure oil ring now in use is the compound ring having both cast iron and steel elements. However, a high pressure steel ring is not satisfactory as a compression ring to prevent blow-by because the frictional contact between the steel ring and cylinder produces scuffing and scoring in the more poorly lubricated and hotter upper reaches of the cylinder.

I have discovered that a compound ring made up of both cast iron and steel elements may be safely used in the upper ring grooves with surprisingly good results, provided the pressure of the steel element is properly controlled so that the steel element will just fit snugly against the cylinder wall when in action with sufficient pressure only to maintain its seat on the wall during the rapid action of the piston.

It is thus the object of the invention to provide a compound piston ring made up of both cast iron and spring steel elements which will operate in the top piston groove to eliminate "blow-by" and compression loss, and at the same time will not injure the cylinder wall.

It is a further object of the present invention to arrange the cast iron and steel rings, relative to each other, so that they will reduce to a minimum the amount of gas losses around the back of the rings on the compression stroke.

My improved ring also improves the lubrication at the top of the cylinder, as will be better apparent from a detailed description of the invention in connection with the accompanying drawing, in which:

Figure 1 is a side elevation of a conventional piston equipped with my improved piston ring; Figure 2 is an enlarged vertical cross-section taken on the line 2—2 of Figure 1; Figure 3 is an enlarged side elevation of a compression ring embodying the principles of my invention, parts being broken away, and Figure 4 is an enlarged cross-section through my improved ring similar to the section in Figure 2.

Referring to the drawings, P represents a conventional piston having the usual ring grooves a, b, c and d, the two upper grooves of which are each fitted with my improved piston ring R.

The ring R is of a similar construction to that of my co-pending application Ser. No. 141,643 (now Patent 2,577,140) in that it comprises a cast iron element 1 of the usual construction and a spring steel element 2 consisting of a two-turn helix having an offset portion 3 between the ends 4, 4 of the ring turns 5, 5. This offset 3 or step formation results in parallelism of the turns throughout, practically, their entire circumference to insure their lying flat in the ring grooves and against the surface of the cast iron ring 1 with which they contact.

In the construction of the application above referred to the steel helical ring 2 is placed below the cast iron ring 1 which serves to shield the ring 2 from the great heat at the top of the piston. However, in some instances this advantage is outweighed by the advantage of maintaining a tight seal between the piston ring and bottom of the ring groove. Since the cast iron ring is machined a much more intimate contact between it and the ring groove (also machined) can be obtained than between the helical ring (formed from a ribbon of steel, or flat wire) and the bottom of the ring groove. These points may appear of minor importance, but in view of the working clearance that must be maintained between piston ring and ring lands they become major matters for consideration. As compression ratios increase these problems become more serious. In the ring R the cast iron ring element 1 will bear with substantial pressure against the wall of the cylinder C while the steel helical element 2 will merely exert enough pressure against the cylinder C to contact therewith entirely around its periphery.

In order to reduce the friction between the steel rings 2 and the cylinder wall C the narrow cylinder contacting edges of the rings R are plated with chromium layers 6, 6 (shown enlarged, Figure 4). This anti-friction surface coupled with the low radial ring tension produces a steel ring that practically floats over the cylinder wall but still maintains 100% circumferential contact to insure a compression tight seal.

There are thus two principles involved in the present invention. The one is the provision of a combined cast iron and steel ring in the compression grooves of the piston, wherein the steel rings merely exert sufficient pressure against the cylinder wall to maintain contact therewith.

The other principle is the relative arrangement of the rings to take advantage of the constructional feature for obtaining a maximum compression seal.

The advantages of my invention may be summed up as follows:

1. The helical spring steel ring is gapless and serves to seal the gap in the cast iron ring to prevent blow-by.
2. Light unit pressure in top groove avoids ring scuffing and cylinder wall scoring.
3. The steel ring maintains contact with cylinder wall essentially through its circularity (due to helical winding) and not pressure.
4. Helical ring is not subject to collapse because wound in a plurality of resilient turns.
5. Maximum compression seal with a minimum unit ring pressure.
6. Reducing the heating effect on the ring by reducing the frictional resistance between the ring and the cylinder wall.

Having described my invention, I claim:

1. In combination with an internal combustion engine, a piston ring comprising a cast iron split annular element having an inherent radial tension to exert substantial pressure against the cylinder wall of the engine and thereby prevent blow-by, and a spring steel helical element juxtaposed to the cast iron element, said helical element having a negligible inherent radial tension merely to exert sufficient pressure against the engine cylinder wall to maintain circumferential contact therewith, said helical element being disposed above the cast iron element.

2. In combination with an internal combustion engine, a piston ring comprising a cast iron split annular element having an inherent radial tension to exert substantial pressure against the cylinder wall of the engine and thereby prevent blow-by, and a spring steel helical element juxtaposed to the cast iron element, said helical element having a negligible inherent radial tension merely to exert sufficient pressure against the engine cylinder wall to maintain circumferential contact therewith and the cylinder contacting surface of the helical element having a thin coating of chromium.

3. In combination with an internal combustion engine, a piston ring comprising a cast iron split annular element having an inherent radial tension to exert substantial pressure against the cylinder wall of the engine, and a spring element coiled in a plurality of turns from a flat ribbon of steel, said spring element having a negligible radial tension merely to exert sufficient pressure against the engine cylinder to maintain circumferential contact therewith and the cylinder contacting surface of the helical element being coated with a non-ferrous metal having a low coefficient of friction.

4. In an internal combustion engine having a cylinder and a piston operating thereon, said piston having a ring groove, a two element piston ring in said groove, one of said elements comprising a split cast iron annulus, and the other element comprising a spring steel helical ring of negligible radial pressure disposed between the cast iron ring and the upper land of the ring groove, the cylinder contacting surface of the helical ring having a coating of chromium.

MELVIN W. MARIEN.

REFERENCES CITED

The following references are of record in the file of this patent:

UNITED STATES PATENTS

| Number | Name | Date |
|---|---|---|
| 2,148,997 | Phillips | Feb. 28, 1939 |
| 2,269,763 | Grant | Jan. 13, 1942 |
| 2,287,884 | Jominy | June 30, 1942 |

FOREIGN PATENTS

| Number | Country | Date |
|---|---|---|
| 281,545 | Great Britain | of 1927 |